Patented July 12, 1927.

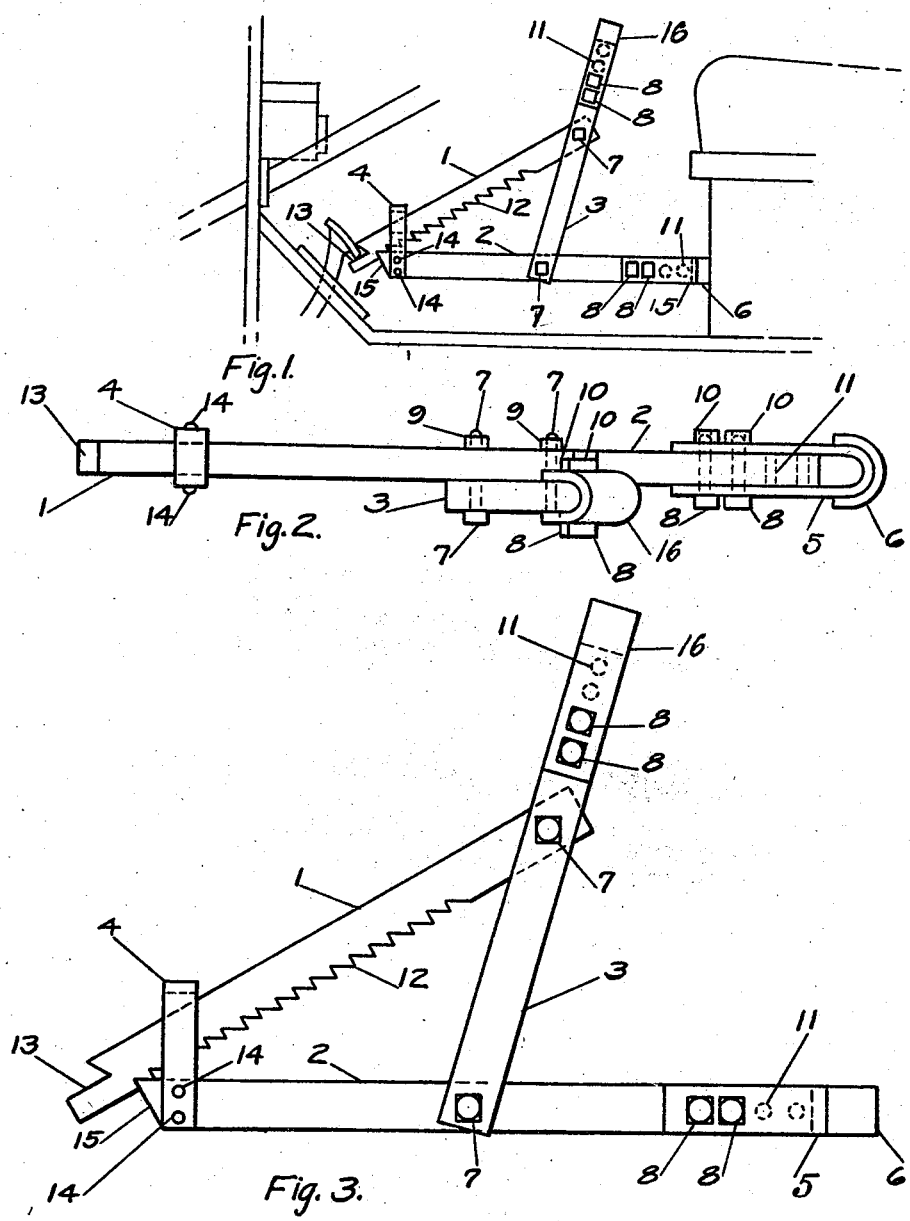

1,635,417

UNITED STATES PATENT OFFICE.

RAYMOND C. HUMPHREY, OF PITTSFIELD, MASSACHUSETTS.

AUTOMOBILE BRAKE ADJUSTER.

REISSUED

Application filed December 10, 1926. Serial No. 154,015.

My invention relates to a new and useful improvement in an automobile brake adjuster, which may be readily applied to the operating lever of a brake, so as to hold the operating lever in proper position so that the brake bands may be properly adjusted.

Another object of the device is to provide an adjustable handle that may be lengthened to provide means to increase the leverage on the said handle, thereby allowing a greater force to be applied to the operating lever of a brake.

A still further object of the device is to provide a base member that is adjustable and can be applied to different makes of automobiles.

With the foregoing and other objects in view, the invention resides in a certain novel and useful construction and arrangement as will be hereinafter more fully described, set forth in the appended claims, and illustrated in the accompanying drawing, in which:—

Figure 1 shows the device as applied to the brake pedal of an automobile, when in operative position.

Figure 2 is a plan view of the device.

Figure 3 is a side elevation view of the device.

Referring more particularly to the drawings, wherein like numerals indicate like parts, 2 designates a base member angularly shaped at one end as shown by the numeral 15. A base extension member 5 is secured to the base member 2 by means of the bolts 8 and the nuts 10. The base extension member provides the means whereby the base member may be extended to fit the different make of automobiles, by moving the base extension member outward and inserting the bolts 8 thru the base extension member 5 and the holes 11 in the base member 2. The forward end of the base member 2 is provided with a guide 4 which is rigidly secured to the base member by means of the rivets 14. A cushion 6 of leather or a similar material is fastened to the base extension member 5 on the base member, and prevents the device from slipping or marring the automobile when it is in operation.

A hand lever 3, for manually operating the device, is pivoted to the base member 2 by means of the bolt 7 and the nut 9. The hand lever is provided with a handle extension member 16 to provide means to lengthen the handle so that a greater leverage may be applied on the said handle, thereby allowing a greater force to be applied to the operating lever of a brake, and also to extend the handle above the seat of an automobile so that it may be operated without interference. It will be seen by referring to the drawing that my device is so constructed that I can use an exact design of a handle extension member on the handle 3 as I use on the base member, and the means of adjustment is the same as on the base member, that is, by inserting the bolts 8 thru the handle extension member 16 and the holes 11 in the handle 3.

A depressing member 1 is pivoted to the handle 3 by means of the bolt 7 and the nut 9. The forward and upper end of the depressing member is provided with a recess 13 so that it may readily engage with the foot pedal of an automobile brake. The under side of the depressing member is provided with a plurality of notches 12 that engage with the angularly disposed end of the base member. The depressing member is in the same perpendicular plane with and above the base member, and held in that position by means of the guide 4. The depressing member works slidably thru the guide 4, and the guide is so constructed that there is sufficient clearance between the guide and the depressing member to take care of the irregular angularity of the depressing member when in different operative positions when the notches on the depressing member engage with the angularly shaped end of the base member.

What I claim is:

1. In an automobile brake adjusting device, the combination of a base member, a base extension member attached to the said base, a guide attached to the base member, a handle pivoted to the base member, a handle extension member attached to the handle, a depressing member pivoted to the said handle and in the same perpendicular plane with and above the base member.

2. In an automobile brake adjusting device, the combination of a base member angularly shaped at one end, a base extension member attached to the said base member and in alignment thereto, a guide attached to the base member, a handle pivoted to the base member, a handle extension member attached to the handle and in alignment thereto, a depressing member pivoted to the said handle and in the same perpendicular plane with and above the base member.

3. In an automobile brake adjusting device, the combination of a base member angularly shaped at one end, a base extension member attached to the said base member, and means for locking the base extension member at any predetermined adjustment, a guide attached to the base member, a handle pivoted to the base member, a handle extension member attached to the handle, and means for locking the handle extension member at any predetermined adjustment, a depressing member pivoted to the base member, said depressing member provided with a plurality of notches on the under side, and also provided with a recess on the free end to engage with a foot pedal of an automobile brake, said depressing member in the same perpendicular plane with and above the base member.

4. In an automobile brake adjusting device, the combination of a base member angularly shaped at one end, a base extension member attached to said base member, and adapted to be extended or removed, a guide attached to the base member, a handle pivoted to the base member, a handle extension member attached to the said handle and adapted to be extended or removed, a depressing member pivoted to the said handle, and the said depressing member provided with a plurality of notches on the under side, and also provided with a recess on the free end, said depressing member in the same perpendicular plane with and above the base member and free to work slidably thru the guide to cause the notches on the depressing member to engage with the angularly shaped end of the base member.

In testimony whereof I affix my signature.

RAYMOND C. HUMPHREY.